US008348113B2

(12) United States Patent  (10) Patent No.: US 8,348,113 B2
Huang  (45) Date of Patent: Jan. 8, 2013

(54) FIXING ASSEMBLY FOR CARRYING A BIKE

(75) Inventor: Ching-Shu Huang, Tainan (TW)

(73) Assignee: Hern Juei Co., Ltd., Tainan (TW)

( * ) Notice: Subject to any disclaimer, the term of this patent is extended or adjusted under 35 U.S.C. 154(b) by 333 days.

(21) Appl. No.: 12/789,969

(22) Filed: May 28, 2010

(65) Prior Publication Data

US 2011/0290840 A1  Dec. 1, 2011

(51) Int. Cl.
 *B60R 9/10* (2006.01)
(52) U.S. Cl. ....... 224/567; 224/568; 224/924; 24/68 SK
(58) Field of Classification Search .................. 224/567, 224/568, 924; 24/68 SK, 70 SK, 71 SK
See application file for complete search history.

(56) References Cited

U.S. PATENT DOCUMENTS

| 3,662,435 | A * | 5/1972 | Allsop | ........................ 24/70 SK |
| 6,561,398 | B1 * | 5/2003 | Cole et al. | ...................... 224/324 |
| 7,213,731 | B1 * | 5/2007 | Kolda | ........................... 224/537 |
| 2001/0040139 | A1 * | 11/2001 | Dean et al. | ....................... 211/17 |

* cited by examiner

*Primary Examiner* — Justin Larson
*Assistant Examiner* — Adam Waggenspack
(74) *Attorney, Agent, or Firm* — J.C. Patents

(57) ABSTRACT

A fixing assembly for carrying a bike includes a main body having a transverse hole provided therein with transverse ribs to be secured with a rod of a carrying stand on a motor vehicle. The main body is formed with a concave portion with vertical ribs for positioning a bike frame rod or a bike wheel thereon, having a first strap with lots of one-way ratchets and a second strap for receiving an engaging device that has a base to be secured with the second strap. The base is provided with a micro-adjusting member for adjusting combined tightness of the first and the second strap, and an engaging member for engaging the one-way ratchets of the first strap to prevent the first strap from moving reversely and a releasing member for pulling open the engaging member to release and separate the first strap and the second strap.

20 Claims, 9 Drawing Sheets

FIXING ASSEMBLY FOR CARRYING A BIKE

BACKGROUND OF THE INVENTION

This invention relates to a fixing assembly for carrying a bike, particularly to one that is to be secured with a rod of a carrying stand, formed with a concave portion for positioning a bike frame rod or a bike wheel, and provided with an engaging device for combining a first strap together with a second strap and a micro-adjusting member for adjusting the combined tightness of the first and the second strap.

DESCRIPTION OF THE PRIOR ART

A conventional bike carrying device, as disclosed in a U.S. Pat. No. 6,561,398 B1 titled "Rack assembly for a vehicle", is provided with a support member 14 having one side disposed with a securing apparatus 16 and another side set with a strap 20. Thus, the strap 20 can be inserted in the housing 18 of the securing apparatus 16 to be firmly fixed with the securing apparatus 16 by mutual engagement of a locking member 30 installed in the housing 18 and plural teeth 58 of the strap 20, and a drive actuator 42 is provided for carrying out micro-adjustment. After the drive actuator 42 is swung open to release the locking member 30, the strap 20 can be drawn out to release the bike wheel for removing down the bike. On the contrary, when the bike wheel is positioned in the support member 14, with the strap 20 and the housing 18 combined together, the bike can be secured on the rack assembly. However, the conventional rack assembly is to have the securing apparatus 16 at one side or both sides of the support member 14 combined with the strap 20 for fixing the bike in place; therefore, the combined tightness of the securing apparatus 16 and the strap 20 is hard to be adjusted and further, having the wheel tied up by only one single strap, the bike can hardly be fixed stably in position.

SUMMARY OF THE INVENTION

The objective of this invention is offer a fixing assembly for carrying a bike, convenient to fix a rod of a bike frame or a bike wheel in place, easy to adjust tightness of fixing the bike and stably carrying it on a motor vehicle.

The fixing assembly for carrying a bike in the present invention is to have an engaging device assembled on a second strap for combining a first strap together with the second strap. The engaging device is provided with a micro-adjusting member for adjusting the combined tightness of the first and the second strap, an engaging member for engaging the one-way ratchets of the first strap and a releasing member for pulling open the engaging member to release and separate the first strap and the second strap. The fixing assembly is first secured with a rod of a carrying stand on a motor vehicle and next, a rod of a bike frame or a bike wheel is placed on a concave portion of the fixing assembly, and then the first strap and the second strap are combined together by the engaging device and lastly, the micro-adjusting member is operated to adjust the combined tightness of the first and second strap.

BRIEF DESCRIPTION DRAWINGS

This invention will be better understood by referring to the accompanying drawings, wherein.

DETAILED DESCRIPTION OF THE PREFERRED EMBODIMENT

Figure 1:
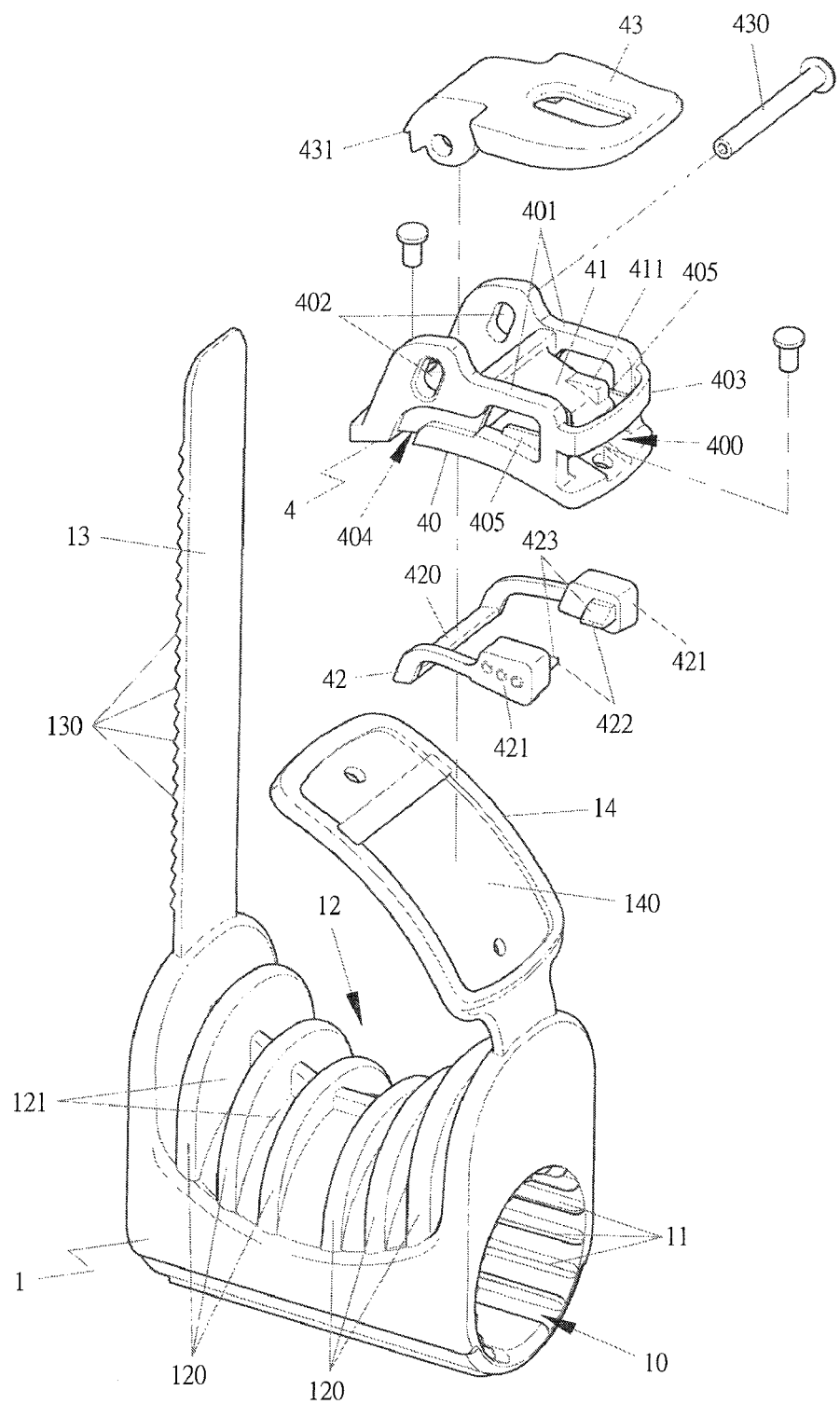
FIG. 1 is an exploded perspective view of a fixing assembly for carrying a bike in the present invention.
Figure 2:
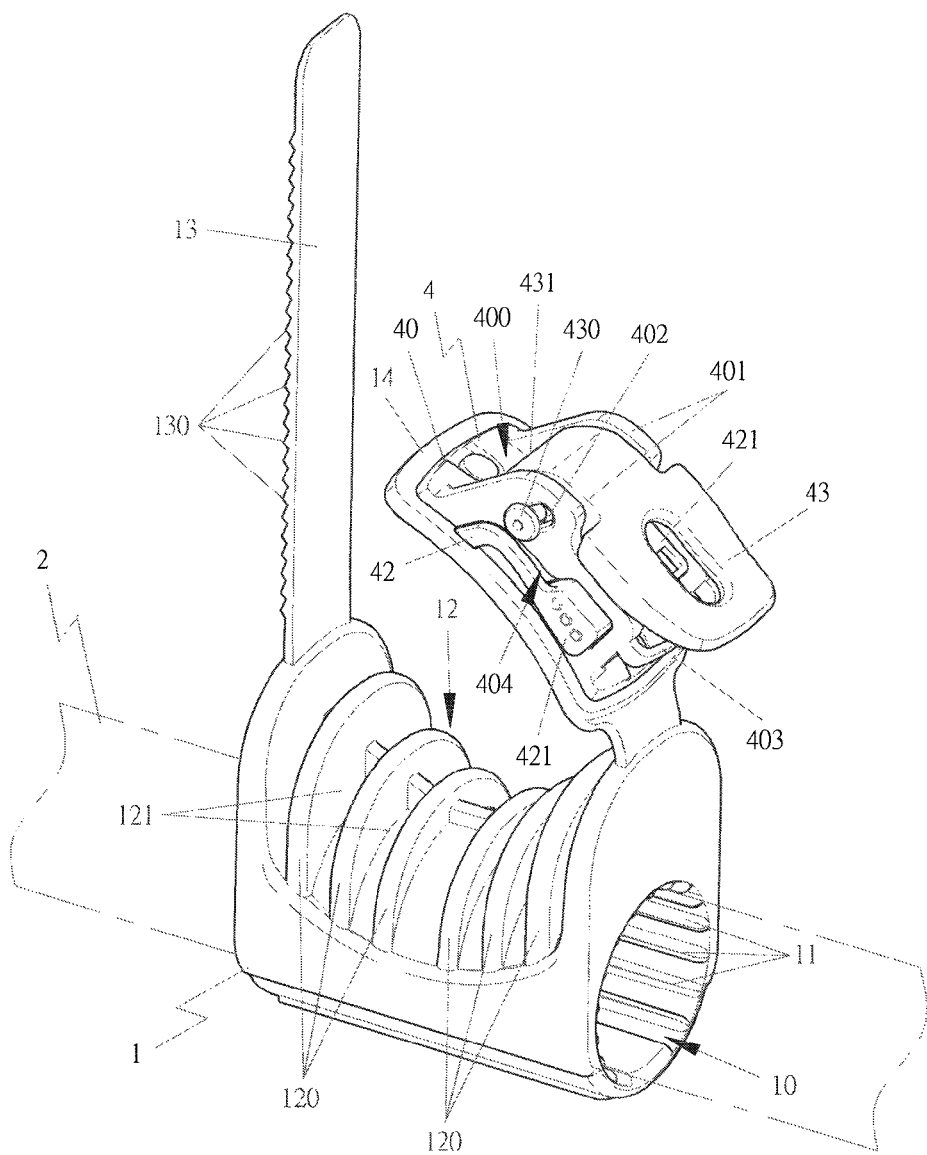
FIG. 2 is a perspective view of the fixing assembly for carrying a bike in the present invention.

A preferred embodiment of a fixing assembly for carrying a bike in the present invention, as shown in FIGS. 1 and 2, includes a main body 1 and an engaging device 4 as main components combined together.

Figure 5:
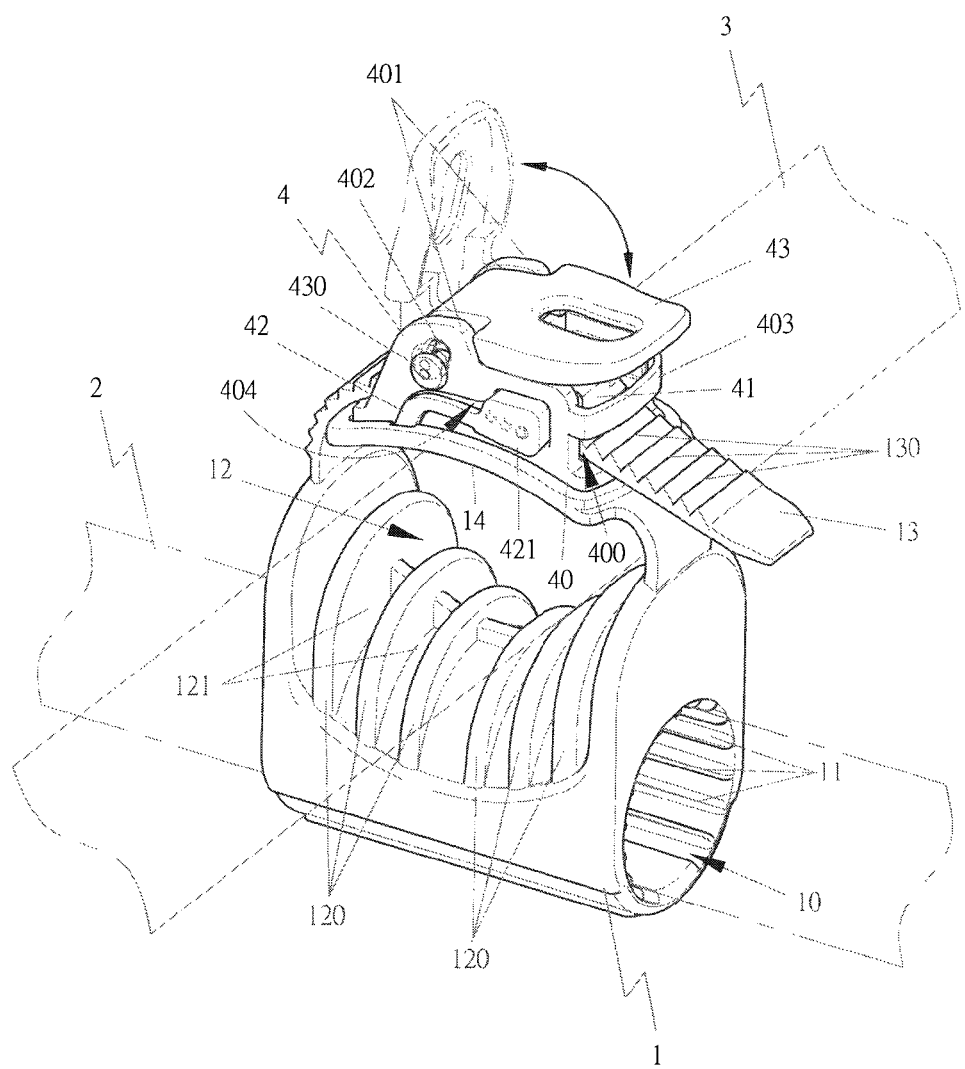
FIG. 5 is a schematic view of the fixing assembly secured with a bike carrying stand in the present invention.

The main body 1 is formed with a transverse hole 10 provided therein with a plurality of transverse ribs 11 with proper flexibility and spaced apart from each other. The transverse hole 10 of the main body 1 is to be firmly fitted with the rod of the carrying stand 2 on a motor vehicle. Further, the main body 1 is disposed with a concave portion 12 fixed thereon with a plurality of vertical ribs 120, with a space 121 separating every two adjacent vertical ribs 120, enabling the vertical ribs 120 provided with proper flexibility, and the top of each vertical rib 120 is arc-shaped to match with the shape of a bike frame rod 3 or a bike wheel, as shown in FIG. 5, so that the bike frame rod 3 or the bike wheel can be positioned thereon conveniently. Furthermore, the main body 1 has one side formed integral with a first strap 13, which has one side provided with one-way ratchets 130 arranged closely, and the other side formed integral with a second strap 14 formed with a surface 140 for connecting the engaging device 4 thereon.

Figure 3:
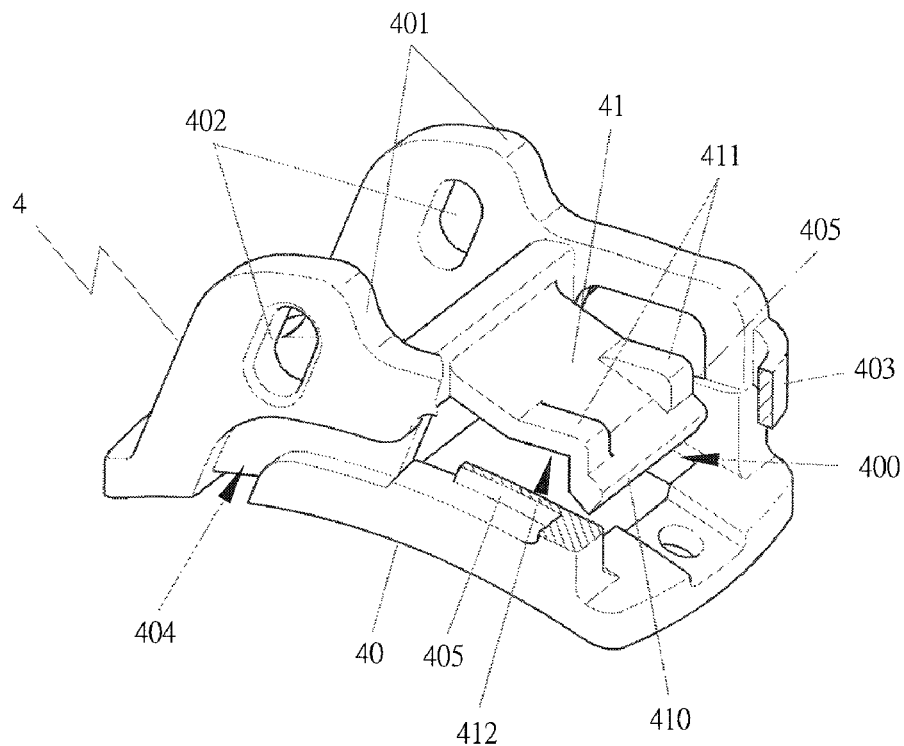
FIG. 3 is a perspective view of the base of an engaging device in the present invention.
Figure 4:
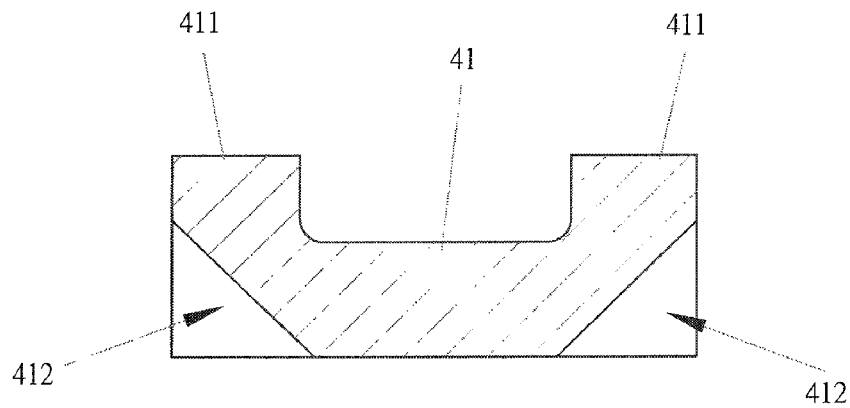
FIG. 4 is a cross-sectional view of an engaging member of the engaging device in the present invention.
Figure 6:
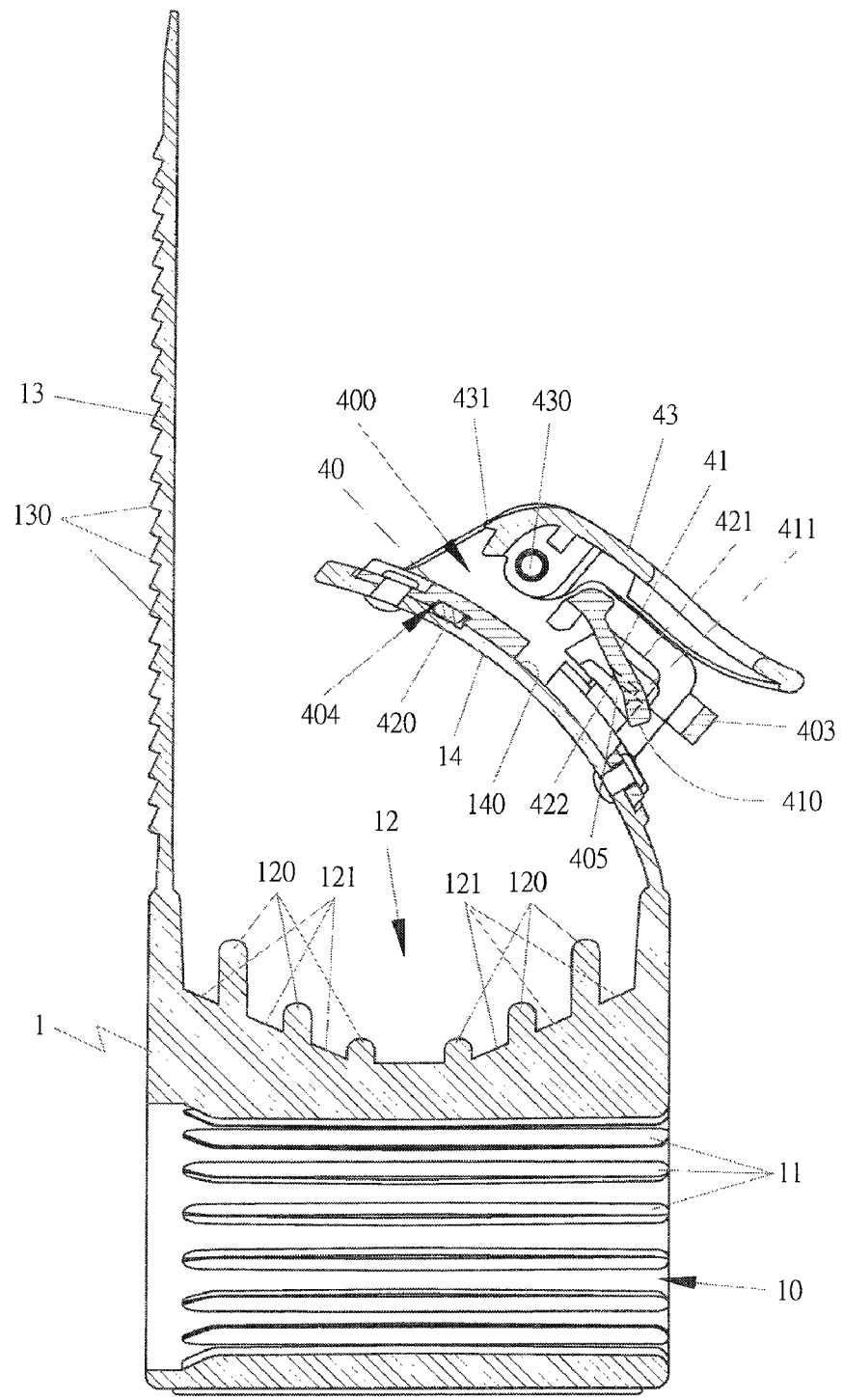
FIG. 6 is a cross-sectional view of the fixing assembly for carrying a bike in the present invention.

The engaging device 4, as shown in FIGS. 2, 3 and 4, is provided with a base 40 to be firmly assembled with the second strap 14, as shown in FIG. 2. The base 40 is formed with a strap passageway 400 for the first strap 13 to be inserted therethrough, as shown in FIG. 6 and provided with two opposite side walls 401 respectively having a rear end bored with a hole 402 for a support shaft 430 of a micro-adjusting member 43 to be inserted therein. The two opposite side walls 401 have their front end connected with a front wall 403 suspended in the air for strengthening the base 40 and preventing the first strap 13 from slacking and slipping off. The base 40 is further provided with a notch 404 extending downward from the rear end of the two side walls 401 to the lower side of the base 40 and located between the two side walls 401 for receiving a releasing member 42 therein, and a support seat 405 is formed at an inner side of the two side walls 401 of the base 40 for supporting the releasing member 42.

Figure 7:
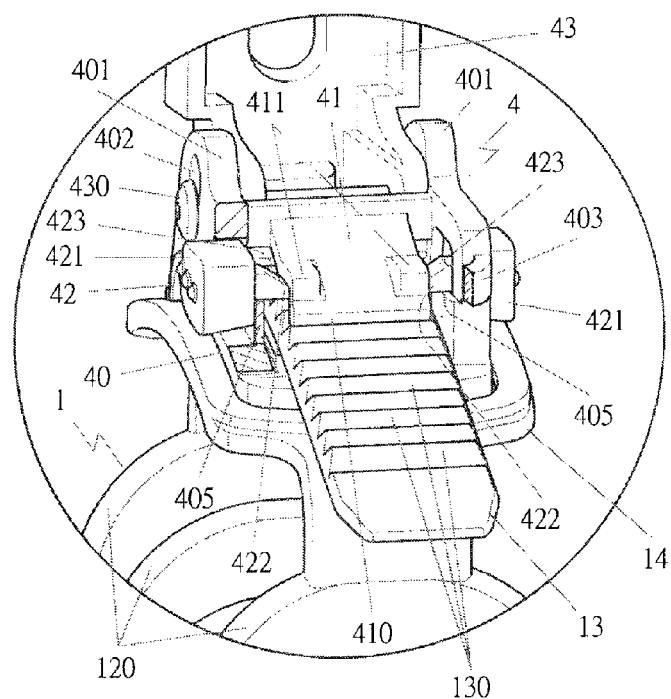
FIG. 7 is a front perspective view of the fixing assembly for carrying a bike in the present invention.
Figure 8:
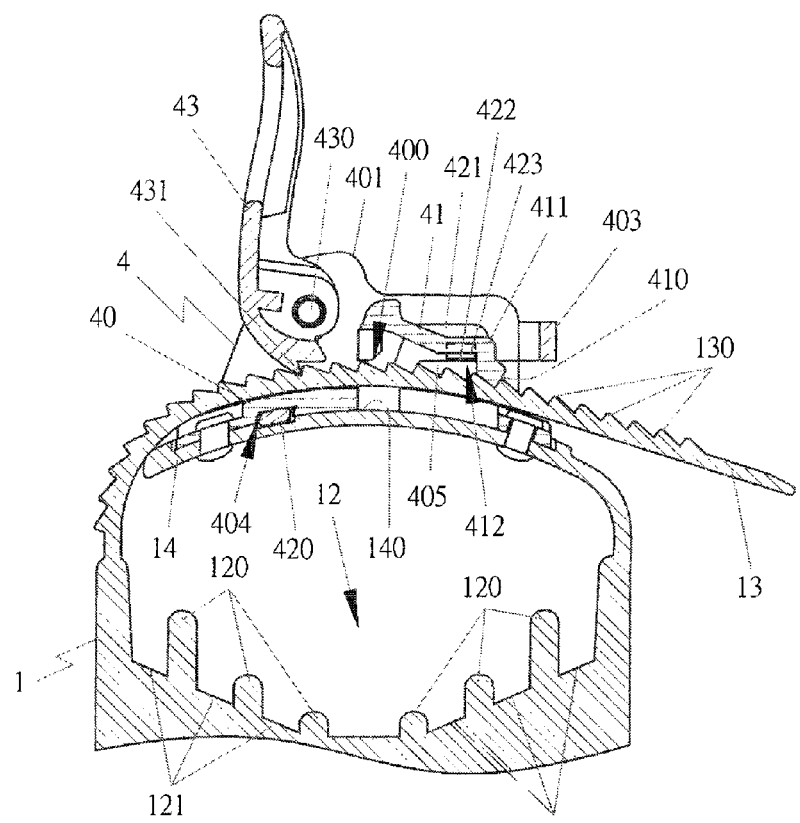
FIG. 8 is a first schematic view illustrating action of micro-adjustment in the present invention.

Referring to FIGS. 3 and 4, the engaging device 4 is composed of an engaging member 41, the releasing member 42 and the micro-adjusting member 43. The engaging member 41 has its inner end formed integrally with the base 40, but the engaging member 41 and the base 40 can also be made separately and then combined together. The engaging member 41 is disposed with an engaging end 410 to be correspondingly engaged with the one-way ratchets 130 of the first strap 13, as shown in FIGS. 7 and 8, so as to prevent the first strap 13 from moving reversely. The engaging member 41 is also formed with two opposite projections 411 for reinforcing the structure, and the two projections 411 have their undersides respectively formed with a space 412 for receiving the actuator 422 of the releasing member 42.

The releasing member 42 made in a same shape as the notch 404 of the base 40 is provided with an extension rod 420 positioned in the notch 404 of the base 40 and having two ends respectively disposed with a press member 421 that has an inner side formed with an actuator 422 with a slant surface 423. The engaging member 41 can be actuated to move upward to a certain height by the actuators 422, which are disposed above the support seat 405 of the base 40 and positioned in the spaces 412 under the projections 411 of the engaging member 41.

Figure 9:
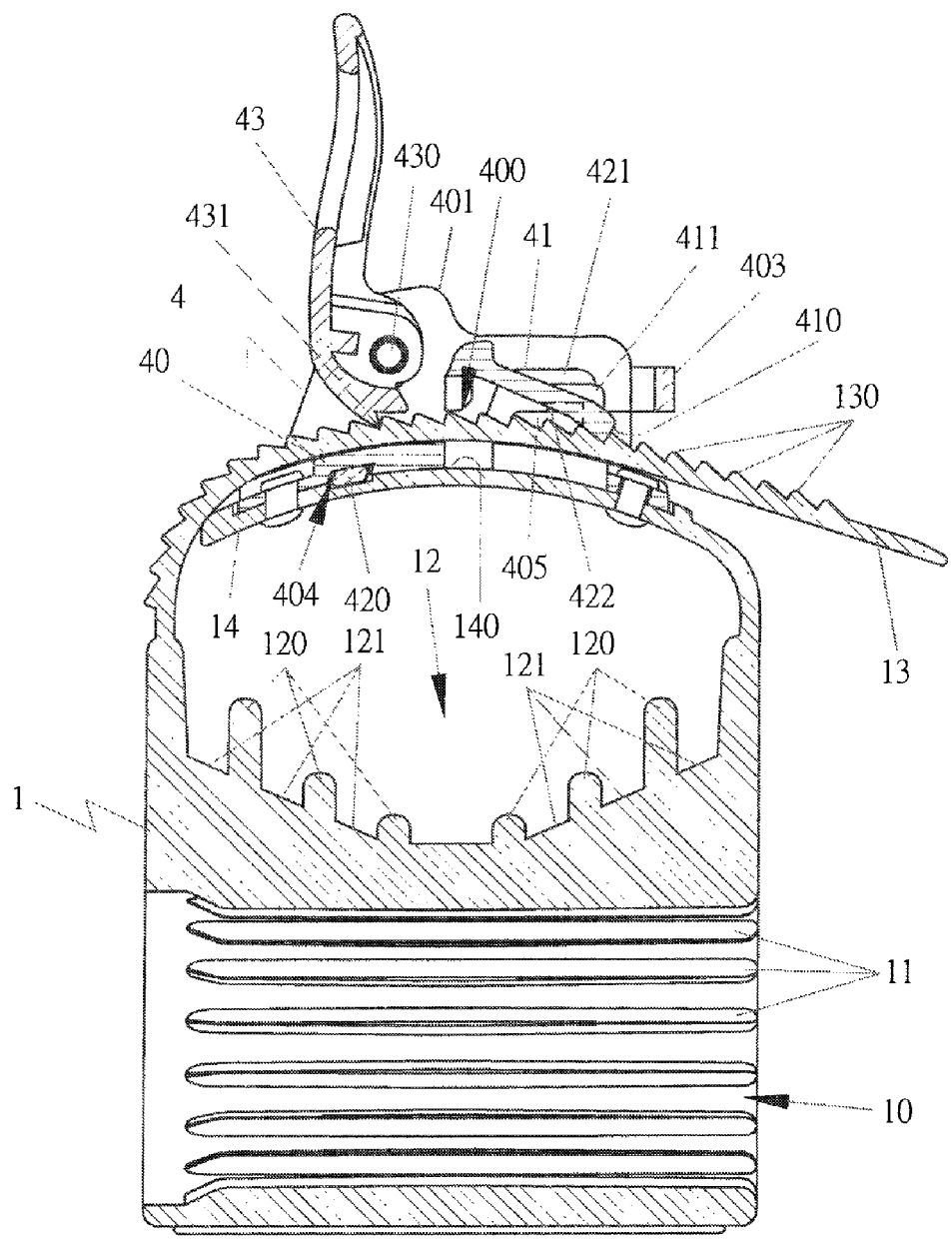
FIG. 9 is a second schematic view illustrating action of micro-adjustment in the present invention.
Figure 10:
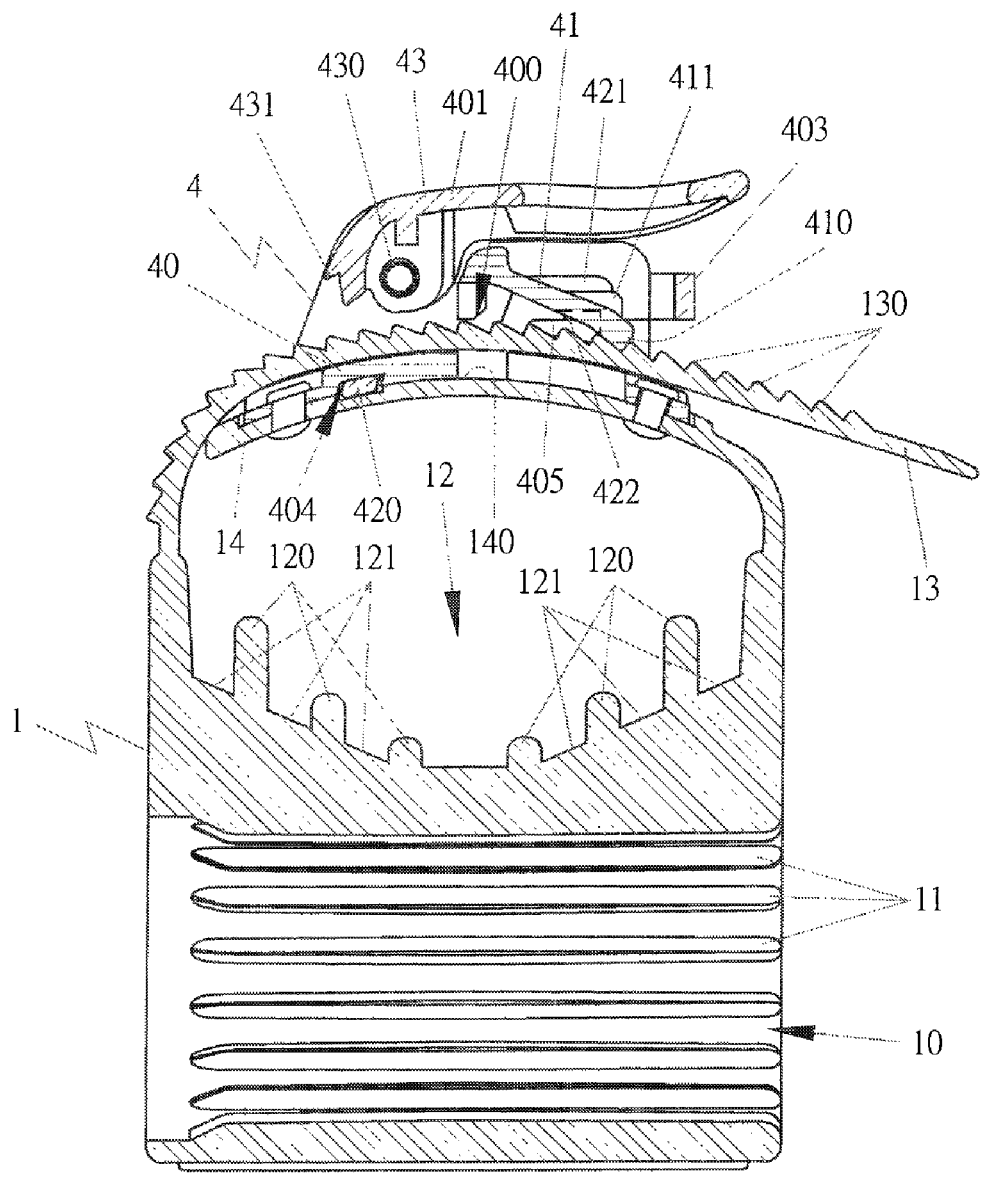
FIG. 10 is a schematic view illustrating that micro-adjusting is finished in the present invention.

The micro-adjusting member 43, as shown in FIGS. 1 and 2, is provided with a support shaft 430 to be inserted in the holes 402 of the base 40 for combining the micro-adjusting member 43 together with the base 40, letting the micro-adjusting member 43 moved only in one direction, as shown in FIGS. 9 and 10. The micro-adjusting member 43 is provided with an actuating tooth 431 for engaging and actuating the one-way ratchets 130 of the first strap 13 to move forward in order to adjust the combination tightness of the first strap 13 and the second strap 14.

Figure 11:
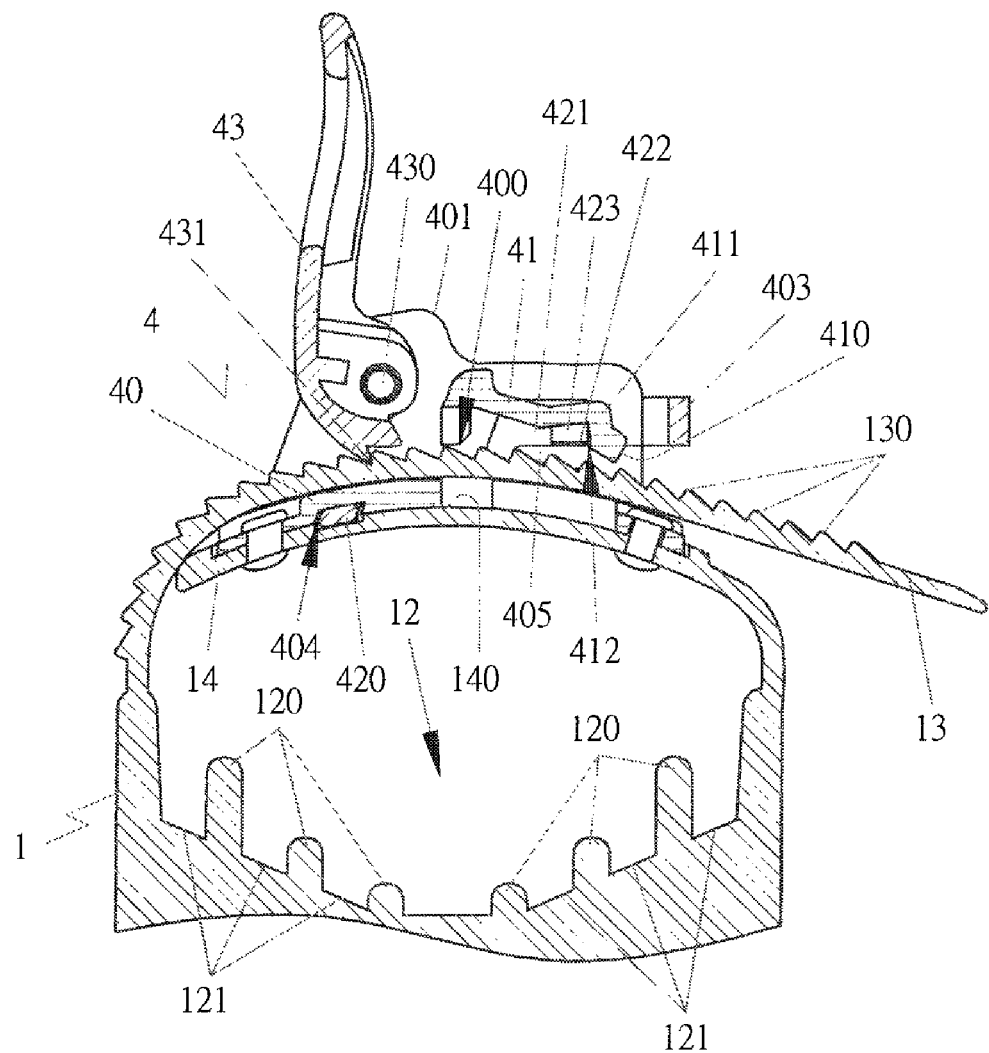
FIG. 11 is a schematic view illustrating that the fixing assembly for carrying a bike is released in the present invention.

When a bike is to be carried, as shown in FIG. 2, the main body 1 of the fixing assembly is first secured with the rod of the carrying stand 2 on a motor vehicle and then, the rod of the frame 3 or the wheel of the bike is placed on the concave portion 12 of the main body 1, as shown in FIG. 8. Next, the first strap 13 is combined with the engaging device 4 and engaged by the engaging member 41, letting the first strap 13 and the second strap 14 fixed together at a first time. At this time, pull the micro-adjusting member 43 to have the actuating tooth 431 pushing the one-way ratchets 130 of the first strap 13, letting the first strap 13 moved forward continuously until the rod of the bike frame 3 or the bike wheel is fastened tightly, as shown in FIGS. 9 and 10. To remove down the bike, simply press the releasing member 42 to let the actuators 422 of the releasing member 42 actuate the engaging member 41 to have the engaging end 410 disengaged from the one-way ratchets 130 of the first strap 13, as shown in FIG. 11, and then the first strap 13 is drawn out by hand, as shown in FIG. 6.

As can be understood from the above description, this invention has the following advantages.

1. It is easy to be assembled and simply to be handled.
2. The frame rod and a wheel of a bike can easily be positioned on the fixing frame, and the engaging member can quickly combine the first strap and the second strap together.
3. The micro-adjusting member can easily be operated to adjust the combination tightness of the first strap and the second strap.

While the preferred embodiment of the invention has been described above, it will be recognized and understood that various modifications may be made therein and the appended claims are intended to cover all such modifications that may fall within the spirit and scope of the invention.

I claim:

1. A fixing assembly for carrying a bike comprising a main body bored with a transverse hole to be secured with a rod of a carrying stand on a motor vehicle, said main body provided with a concave portion for positioning a bike wheel thereon, said main body having a first strap with a plurality of one-way ratchets, said main body also provided with a second strap; an engaging device formed with a base to be combined with said second strap, said engaging device provided with an engaging member formed integrally with said base, said engaging member operationally engaging with said first strap, said engaging device having a releasing member for combining or releasing said first strap and said second strap and separating them from each other, said engaging device provided with a micro-adjusting member for adjusting a combined tightness of said first strap and said second strap, said releasing member has an actuator; and firstly, said fixing assembly can be firmly combined with said rod of said carrying stand, then, a bike frame rod or wheel can be positioned on said concave portion of said fixing assembly, subsequently, said first strap and said second strap can be combined together by said engaging member, lastly, the combined tightness of said first strap and said second strap can be adjusted by said micro-adjusting member;

wherein said engaging member has an engaging end and two projections that have their undersides respectively formed with a space for receiving said actuator of said releasing member.

2. A fixing assembly for carrying a bike as claimed in claim 1, wherein said main body is formed with a transverse hole formed therein with transverse ribs spaced apart.

3. A fixing assembly for carrying a bike as claimed in claim 1, wherein said concave portion of said main body is provided with a plurality of vertical ribs, and a space is formed between every two adjacent said vertical ribs, rendering said vertical ribs flexibility, a top of each said vertical rib of said concave portion being arc-shaped.

4. A fixing assembly for carrying a bike as claimed in claim 1, wherein said second strap is formed with a surface for receiving an engaging device thereon.

5. A fixing assembly for carrying a bike as claimed in claim 1, wherein said engaging device has a base provided with a strap passageway for said first strap to be inserted therethrough.

6. A fixing assembly for carrying a bike as claimed in claim 1, wherein said base of said engaging device has two side walls respectively bored with a hole for receiving a support shaft of said micro-adjusting member, said two side walls of said base connected with a front wall.

7. A fixing assembly for carrying a bike as claimed in claim 6, wherein said base is formed with a notch extending downward from a rear end of said two side walls to a lower side of said base for fitting said releasing member therein.

8. A fixing assembly for carrying a bike as claimed in claim 6, wherein a support seat is provided at an inner side of said two side walls of said base for supporting said releasing member.

9. A fixing assembly for carrying a bike as claimed in claim 1, wherein said engaging member has an inner end formed integrally with said base.

10. A fixing assembly for carrying a bike as claimed in claim 1, wherein said releasing member is formed with an extension rod to be fitted in a notch of said base, said extension rod having two ends respectively provided with a press member, said actuator positioned at an inner side of said press member and formed with a slant surface.

11. A fixing assembly for carrying a bike as claimed in claim 1, wherein said micro-adjusting member is combined with said holes of said base by a support shaft and provided with an actuating tooth for engaging and actuating said one-way ratchets of said first strap.

12. A fixing assembly for carrying a bike comprising a main body bored with a transverse hole to be secured with a rod of a carrying stand on a motor vehicle, said main body provided with a concave portion for positioning a bike wheel thereon, said main body having a first strap with a plurality of one-way ratchets, said main body also provided with a second strap;

an engaging device formed with a base to be combined with said second strap, said engaging device provided with an engaging member formed integrally with said base, said engaging member operationally engaging with said first strap, said engaging device having a releasing member for combining or releasing said first strap and said second strap and separating them from each other, said engaging device provided with a micro-adjusting member for adjusting a combined tightness of said first strap and said second strap; and firstly, said fixing assembly can be firmly combined with said rod of said carrying stand, then, a bike frame rod or wheel can be positioned on said concave portion of said fixing assembly, subsequently, said first strap and said second strap can be combined together by said engaging member, lastly, the combined tightness of said first strap and said second strap can be adjusted by said micro-adjusting member;

wherein said releasing member has an actuator and an extension rod to be fitted in a notch of said base, said extension rod has two ends respectively provided with a press member, said actuator is positioned at an inner side of said press member and formed with a slant surface.

13. A fixing assembly for carrying a bike as claimed in claim 12, wherein said main body is formed with a transverse hole formed therein with transverse ribs spaced apart.

14. A fixing assembly for carrying a bike as claimed in claim 12, wherein said concave portion of said main body is provided with a plurality of vertical ribs, and a space is formed between every two adjacent said vertical ribs, rendering said vertical ribs flexibility, a top of each said vertical rib of said concave portion being arc-shaped.

15. A fixing assembly for carrying a bike as claimed in claim 12, wherein said second strap is formed with a surface for receiving an engaging device thereon.

16. A fixing assembly for carrying a bike as claimed in claim 12, wherein said engaging device has a base provided with a strap passageway for said first strap to be inserted therethrough.

17. A fixing assembly for carrying a bike as claimed in claim 12, wherein said base of said engaging device has two side walls respectively bored with a hole for receiving a support shaft of said micro-adjusting member, said two side walls of said base connected with a front wall.

18. A fixing assembly for carrying a bike as claimed in claim 17, wherein said notch extending downward from a rear end of said two side walls to a lower side of said base for fitting said releasing member therein.

19. A fixing assembly for carrying a bike as claimed in claim 17, wherein a support seat is provided at an inner side of said two side walls of said base for supporting said releasing member.

20. A fixing assembly for carrying a bike as claimed in claim 12, wherein said engaging member has an inner end formed integrally with said base.

* * * * *